United States Patent [19]
Chen et al.

[11] Patent Number: 4,962,457
[45] Date of Patent: Oct. 9, 1990

[54] INTELLIGENT VEHICLE-HIGHWAY SYSTEM

[75] Inventors: Kan Chen, Ann Arbor; Robert D. Ervin, Plymouth, both of Mich.

[73] Assignee: The University of Michigan, Ann Arbor, Mich.

[21] Appl. No.: 262,360

[22] Filed: Oct. 25, 1988

[51] Int. Cl.$^5$ .............................................. G08G 1/00
[52] U.S. Cl. .................................... 364/443; 340/905
[58] Field of Search ........ 364/449, 443, 444, 436–438; 340/905, 991, 993, 996, 902, 903

[56] References Cited

U.S. PATENT DOCUMENTS

| | | | |
|---|---|---|---|
| 3,839,717 | 10/1974 | Paul ...................................... | 340/905 |
| 3,899,671 | 8/1975 | Stover .................................. | 340/905 |
| 4,023,017 | 5/1977 | Ceseri .................................. | 340/905 |
| 4,251,797 | 2/1981 | Bragas et al. ........................ | 340/905 |
| 4,350,970 | 9/1982 | von Tomkewitsch .............. | 364/436 |
| 4,408,179 | 10/1983 | Matsumura ......................... | 340/905 |
| 4,591,823 | 5/1986 | Horvat ................................. | 340/53 |
| 4,633,517 | 12/1986 | Pfeifer ................................. | 455/228 |
| 4,706,086 | 11/1987 | Panizza ............................... | 340/902 |
| 4,819,174 | 4/1989 | Furuno et al. ....................... | 364/444 |

*Primary Examiner*—Thomas G. Black
*Attorney, Agent, or Firm*—Rohm & Monsanto

[57] ABSTRACT

An intelligent vehicle-highway system utilizes a transmitter installed on the vehicle for communicating with modules having memory elements for storing site-specific information, a receiver for receiving an enabling signal from the transceiver on the vehicle, and a transmitter for making the site-specific information available to the operator of the vehicle. The data storage system is installed in the vicinity of the roadway, such as alongside of the roadway, overhead of the roadway, or preferably embedded in the roadway itself so as to ensure communication with vehicles within predetermined lanes. In a highly advantageous embodiment, the site-specific data can be changed by reprogramming an erasable memory with a memory programmer, which may be installed on a programming vehicle which is authorized to travel on the roadway for the purpose of reprogramming the data within the data storage systems. Such reprogramming may use access codes which prevent tampering with the stored data. Alternatively, reprogramming of the data storage systems can be performed with the use of local transmitters controlled by a centralized agency. The local transmitters can also communicate directly with the vehicles on the roadway to provide rapid communication of matters of interest to all, such as emergency situations.

12 Claims, 1 Drawing Sheet

INTELLIGENT VEHICLE-HIGHWAY SYSTEM

BACKGROUND OF THE INVENTION

This invention relates generally to systems for providing site-specific information to an operator of a vehicle, and more particularly, to a data communication system which employs electromagnetic data communication between a data storage device installed along a roadway and a vehicle moving therealong.

In addition to being an immediate problem, highway congestion in the United States is expected to continue to increase over the next several decades to the point where the delays experienced under the present conditions as a result of congestion, will quadruple before the end of the first decade of the twenty-first century. Moreover, it is becoming evident that the traditional approaches to the problem of highway congestion, which have included highway expansion programs, will not keep up with the pace of highway usage.

Approximately two-thirds of the vehicle-hours of delay in traffic congestion is the result of accidents and other incidents which are precipitated primarily by the poor judgment and actions of drivers. There clearly exists a need for a system which assists drivers in making highway travel a more orderly process. This is especially crucial in view of the nonlinear relationship between traffic and congestion, wherein an increase of 50% in traffic will produce approximately 400% increase in congestion, beyond the levels that are encountered at the present time.

There are a number of factors which cooperate to produce the need for an increase in the efficiency with which traffic is directed. it is now well recognized that, although highway construction generally kept pace with increases in travel demands during the last few decades, the expansion in the capacity of the highways has stimulated new development and increased the vehicular traffic. At the present, however, programs for expanding interstate highway systems have been winding down, while travel demand has accelerated. In fact, it has been suggested that the worsening crisis in vehicular traffic has now reached the point where mere expansion in the highway capacity will not eliminate the congestion crisis. Moreover, time, money, and real estate are all too scarce to permit highway expansion to be offered in and of itself as the solution to the congestion problem.

One area of very high inefficiency in the traffic system is the human operator. The proper function of the highway system is almost entirely based upon the perceptual, cognitive, and vehicle control skills of human operators. The human factors associated with the individual drivers determine the manner in which each vehicle participates in the traffic stream. Moreover, since individuals cover a tremendous range of attentiveness, attitude, alcohol/drug impairment, and manipulative capabilities, highway systems therefore must be designed to require during use significantly less than the full potential skills of the average driver. It is these factors which determine the headway between vehicles, the choice of lanes of travel, the placement of the vehicle within the lane, the timing of merge maneuvers, the regularity of flow along a dense stream of vehicles, and the selection of a route to be followed to the final destination.

In the course of operating a vehicle, each driver interprets the environment and pursues immediate and longer-term driving strategies. However, drivers can see only a hundred feet ahead and therefore cannot make the most efficient choices of route, lane selection, or speed. Moreover, when incidents occur along the highway, drivers react irrationally, slowing to exaggerated creep speeds while delaying thousands of others so as to observe unnecessarily the scene of the disruption. Human decision making and control skills have the strongest influence on the frequency of collisions, the nominal traffic speed along an artery, and the extent to which an overall road network is utilized to meet the traffic demand.

The foregoing makes evident that the primary drawback in the present vehicle-highway system is a general lack of vehicle-highway control intelligence in view of the highly limited amount of information which is available to each driver. Although certain types of vehicle control intelligence have been applied to improve the efficiency of highway transportation, such as electronic engine control systems and anti-lock braking systems, the drivers are the only source of intelligence which is applied to regulate and control the characteristics and parameters of highway traffic.

It is, therefore, an object of this invention to provide a simple and economical system for providing site-specific information to a driver of a vehicle.

It is also an object of this invention to provide a simple and economical system for providing to a driver information on highway conditions beyond the field of unaided view.

It is another object of this invention to provide a system which increases highway throughput without requiring conventional expansion thereof.

It is a further object of this invention to provide an intelligence system which reduces the need for frequent oscillations in vehicle speed between high-speed spurts and nearly-stopped motion.

It is also a further object of this invention to provide a system which provides drivers with current information on the condition of congestion ahead.

It is additionally an object of this invention to provide a system which provides a driver with guidance for pursuing alternate routes.

It is yet a further object of this invention to provide a system which permits centralized monitoring of traffic conditions on a plurality of highways simultaneously.

It is also another object of this invention to provide an effective system for avoiding collisions between vehicles.

It is yet an additional object of this invention to provide a system which permits a driver to make changes in the contemplated route of travel in response to information on highway and/or traffic conditions ahead of the driver's field of view.

It is still another object of this invention to provide a system which provides to a lost driver information pertaining to the vehicle's location and heading.

SUMMARY OF THE INVENTION

The foregoing and other objects are achieved by this invention which provides in an apparatus aspect thereof, a system for providing site-specific data to the operator of a vehicle moving on a roadway. In accordance with the invention, a transceiver having transmitter and receiver elements is installed on the vehicle. The transmitter portion of the transceiver transmits an enabling electromagnetic signal which is received by a data storage system which contains site-specific data. The data storage system is installed in the vicinity of the roadway, and upon receiving the enabling electromagnetic signal, responds with the site-specific data.

In one embodiment of the invention, the data storage system has associated therewith an erasable memory which contains the site-specific data. In installations where the data storage system is installed in the roadway itself, reprogramming of the erasable memory can be achieved by driving a specialized vehicle over the data storage system, and with the use of a localized radio transmission containing access codes which preferably are secret, reprograms the contents of the erasable memory.

In order to achieve high transmission rates, it may be desirable to transmit the data from the data storage system to the receiver in the vehicle in a coded form. High transmission rates may be essential in embodiments of the invention where traffic moves at high or ultra-high speeds. Computing circuitry, such as a small computer, may be provided to decipher the codes so that the information therein can be made available to the driver. Thus, the system on the vehicle will employ a display, or some other means by which communication can be established with the human operator.

In a contemplated application of the invention, a plurality of data storage systems are arranged along the roadway. As the vehicle is driven in the vicinity of each such data storage system, the information therein is made available to the driver, as set forth hereinabove. Each of the data storage systems is provided with a data transmitter which transmits the site-specific data to the transceiver in the vehicle. Each data storage system is further provided with an energy receiving arrangement, which may be in the form of an antenna, for receiving the enabling electromagnetic signal transmitted by the transceiver in the vehicle. In certain embodiments, the energy contained in the enabling electromagnetic signal is used to energize the data transmitter of the data storage system. In still further embodiments, some of the energy may be stored, such as in a rechargeable cell, for operating the data storage system and its associated components. The electromagnetic signal which is issued by the transmitter in the vehicle may contain interrogation information which enables transmission of the site-specific data.

In accordance with a method aspect of the invention, information pertaining to the conditions in a predetermined geographical location is provided to an operator of a vehicle which is being operated on a roadway. The inventive method comprises the steps of: storing information responsive to the conditions in the predetermined geographical region in a status storage system, the data storage system being arranged in the vicinity of the roadway; transmitting an interrogator signal in the form of electromagnetic energy from an interrogator transmitter installed on the vehicle to the data storage system; receiving at a receiver in the vehicle a data signal containing the information stored in the data storage system; and converting the information in the data signal to a form which is understandable to the operator of the vehicle.

In a specific embodiment of the method aspect of the invention, the data which is transferred to the vehicle contains an identification of the specific location of the associated data storage system. This information assists the driver in determining the location of the vehicle being operated, and will further be useful in the selection of a route to reach the desired destination.

BRIEF DESCRIPTION OF THE DRAWING

Comprehension of the invention is facilitated by reading the following detailed description, in conjunction with the annexed drawing, in which the only annexed figure is a schematic representation in block and line form of a system constructed in accordance with the principles of the invention.

DETAILED DESCRIPTION

Figure 1:
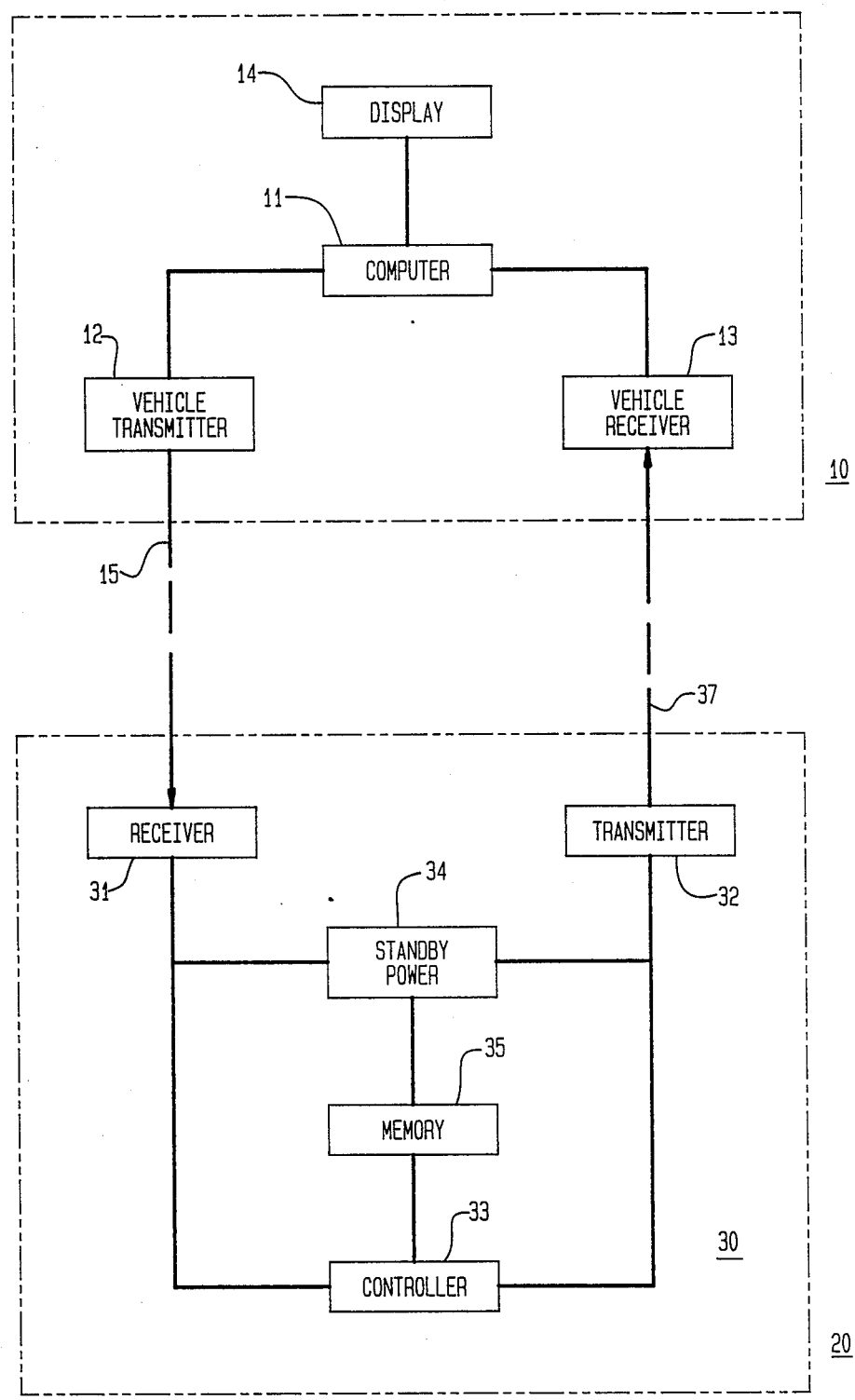

FIG. 1 is a partially schematic block and line representation of an embodiment of the invention wherein a vehicle which is represented by the superior dashed box as vehicle 10, is operated on a roadway which is represented by the inferior dashed box as roadway 20. Referring to vehicle 10, a computer 11 is installed therein and is coupled to a vehicle transmitter 12, a vehicle receiver 13, and a display 14. As vehicle 10 is operated over roadway 20, vehicle 12 issues an enabling signal which is represented by the arrow as enabling signal 15. The enabling signal will be brought into the vicinity of a data storage system 30 such that enabling signal 15 is received at a receiver 31. In this specific illustrative embodiment of the invention, enabling signal 15 permits receiver 31 to perform several functions. These functions are premised on the fact that enabling signal 15 contains both, an enabling energy which can be employed by data storage system 30, and an information component which causes an interrogation of the data storage system.

The power component of enabling signal 15 is received at receiver 31 and employed to apply an enabling power to a transmitter 32 and a controller 33. In this embodiment, some of the energy is conducted to a standby power system 34, which may contain batteries (not shown) therein, illustratively long-life lithium, and in this embodiment, rechargeable batteries (also not shown). The energy from standby power system 34 is applied to a memory 35 which contains the site-specific information.

The information content of enabling system 15 is conducted to controller 33 which interrogates memory 35, and generally controls its functioning. The information contained in memory 35 is then made available to the controller which then transmits same to vehicle 10 via transmitter 32. As previously indicated, transmitter 32 obtains its energy from the power component of enabling system 15 via receiver 31.

In certain embodiments of the invention, enabling signal 15 may have a frequency of 915 MHz. This frequency has been reserved in the electromagnetic system for identification systems. An information signal 37 which is emitted by transmitter 32 may also have a frequency of 915 MHz, but preferably may be doubled to 1830 MHz by a frequency doubling system (not shown) which may be incorporated in controller 33. Such a doubling of the frequency of the responsive signal permits both the vehicle and the data storage system to transmit simultaneously without interference with one another, and thereby the power component of enabling signal 15 can be made available continuously during the transmission of transmitter 32. In certain embodiments, however, it may be desirable to draw some of the energy required by transmitter 32 from standby power system 34. Preferably, the drawing of such power is controlled by controller 33 to ensure that only power which is actually required by transmitter 32 is drawn from standby power system 34. Upon receiving the information signal, the coded information therein is deciphered by computer 11 and offered to the driver of vehicle 10 via display 14.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for providing site-specific data to the operator of a vehicle moving on a roadway, the system comprising:

transceiver means installed on the vehicle, said transceiver means having mobile transmitter means for transmitting an enabling electromagnetic signal, and receiver means for receiving the site-specific data;

data storage means for storing the site-specific data, said data storage means being installed in the vicinity of the roadway for receiving said enabling electromagnetic signal and sending the site-specific data in response thereto site-specific data transmitter means coupled to said data storage means for transmitting said site-specific data to said transceiver means; and energy receiving means coupled to said data storage means for receiving said enabling electromagnetic signal transmitted by said transceiver means, and converting an electromagnetic energy in said enabling electromagnetic signal to electrical energy for energizing said site-specific data transmitter means.

2. The system of claim 1 wherein said data storage means further comprises erasable memory means for containing the site-specific data.

3. The system of claim 1 wherein there is further provided computer means coupled to said transceiver means for deciphering codes contained in the site-specific data received by said transceiver means.

4. The system of claim 3 wherein there is further provided display means for providing to the operator of the vehicle information corresponding to said deciphered codes.

5. The system of claim 3 wherein there are further provided a plurality of data storage means arranged along the roadway, said computer means being responsive to site-specific data received by said transceiver means from a one of said plurality of data storage means most recently passed by the vehicle.

6. The system of claim 1 wherein the site-specific data contains information pertaining to matters specific to the region in the vicinity where said data storage means is located and which may be of interest to the operator of the vehicle.

7. The system of claim 1 wherein there is further provided energy storage means coupled to said energy receiving means for storing said electrical energy.

8. The system of claim 1 wherein said enabling electromagnetic signal contains interrogation information for enabling transmission of said site-specific data via said site-specific data transmitter means.

9. A method of providing information pertaining to the characteristics of a predetermined geographical region which may be of interest to an operator of a vehicle being operated on a roadway in the predetermined geographical region, the method comprising the steps of:

storing the information pertaining to the characteristics in a data storage system arranged in the vicinity of the roadway;

transmitting a request signal in the form of electromagnetic energy from a transmitter installed on the vehicle to said data storage system, said request signal having an interrogator component and an enabling component;

receiving at a receiver in the vehicle a data signal containing said information stored in said data storage system, said information being responsive to said interrogator component of said request signal; and converting said information in said data signal to a form understandable to the operator of the vehicle.

10. The method of claim 9 wherein prior to performing said step of receiving at a receiver in the vehicle there is provided the further step of data transmitting said data signal from a data transmitter coupled to said data storage system, said step of data transmitting being enabled in response to said enablement component of said request signal.

11. The method of claim 9 wherein said step of receiving comprises the further step of identifying said data storage system.

12. The method of claim 9 wherein said step of converting comprises the step of displaying said information.

* * * * *